May 7, 1929.  E. W. BALDWIN  1,711,554
STRAW SPREADER
Filed June 27, 1927  2 Sheets-Sheet 2
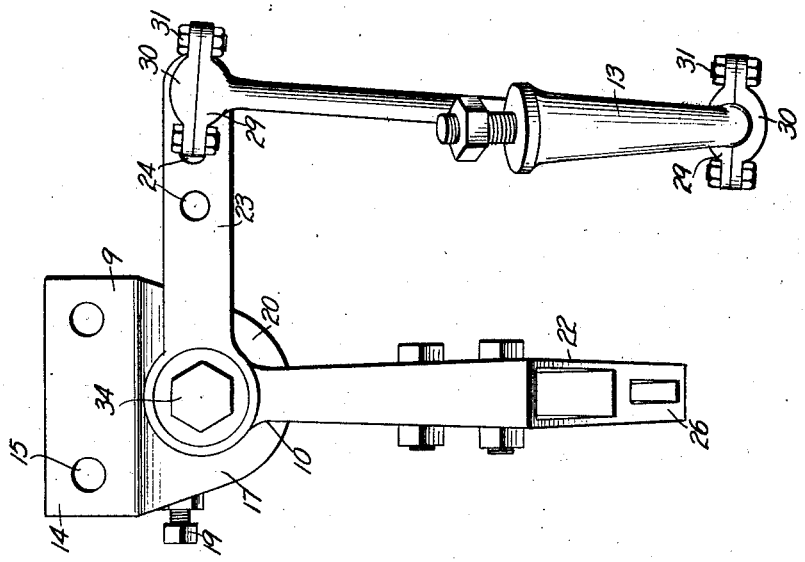
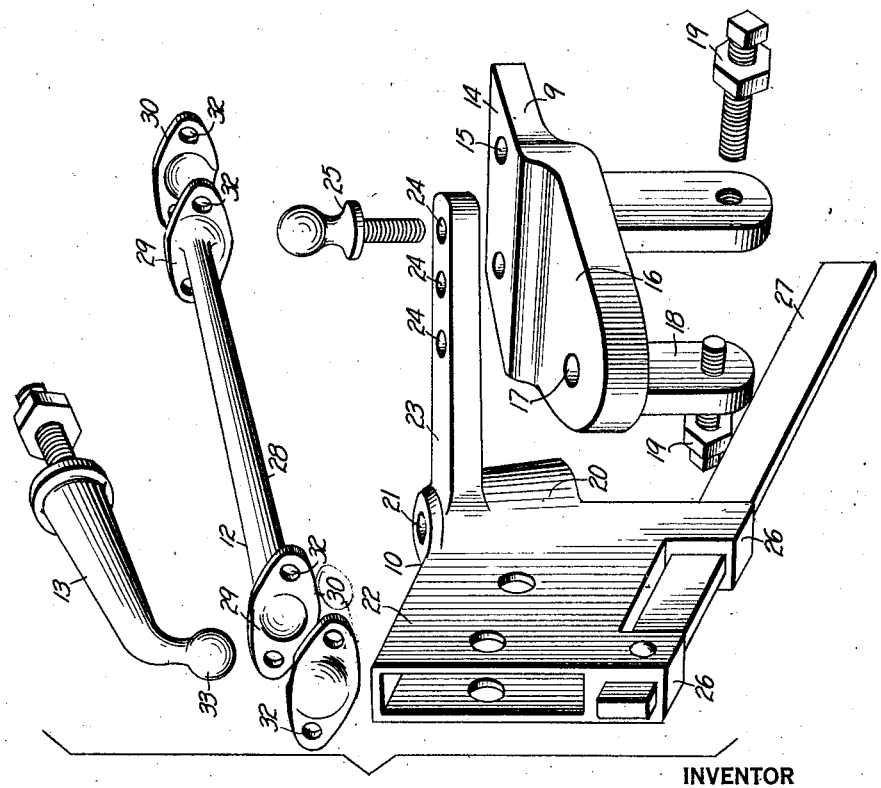
INVENTOR
Ernest W. Baldwin.
BY Arthur E. Brown
ATTORNEY Patented May 7, 1929.

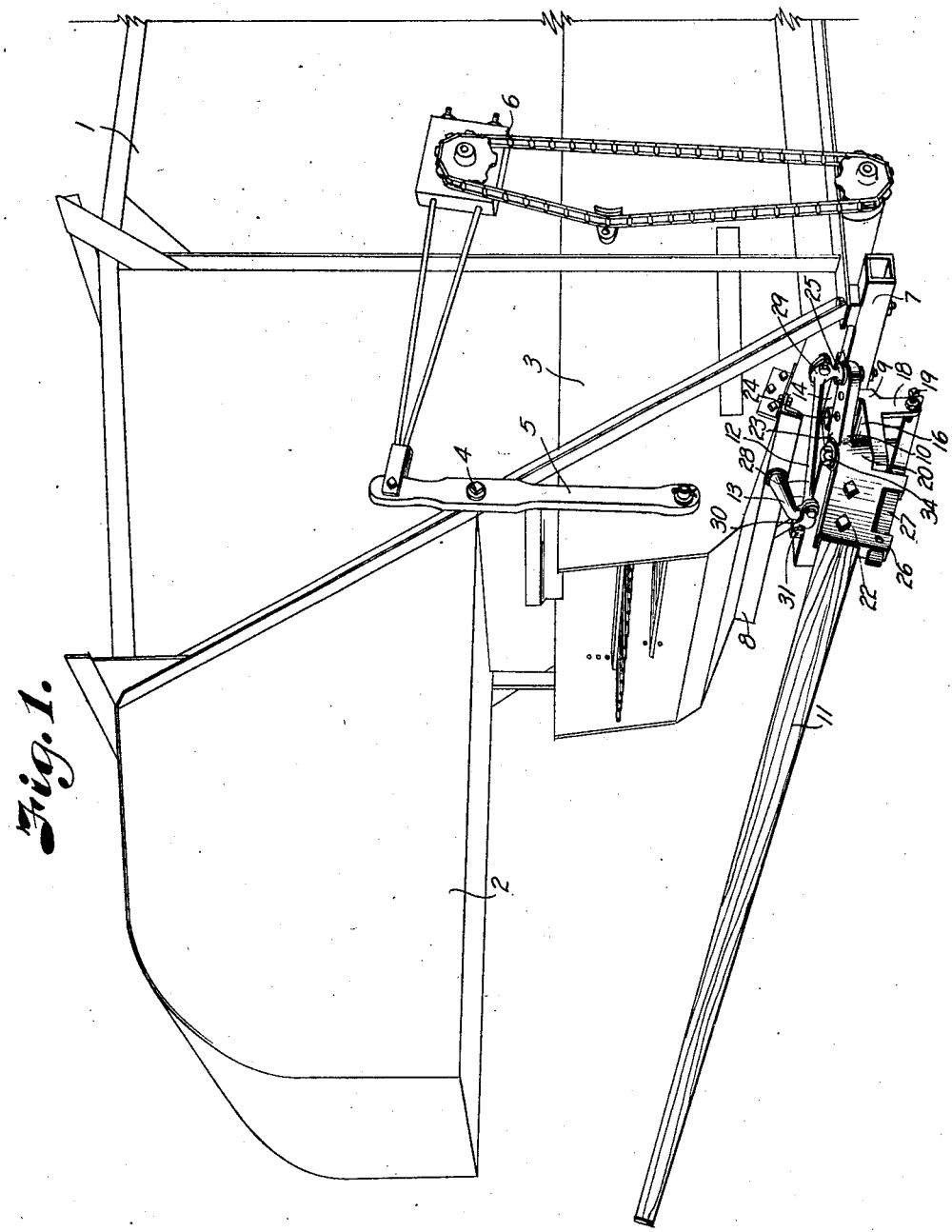

1,711,554

UNITED STATES PATENT OFFICE.

ERNEST W. BALDWIN, OF INDEPENDENCE, MISSOURI, ASSIGNOR TO THE BALDWIN ENGINEERING COMPANY, OF KANSAS CITY, MISSOURI, A COMMON-LAW TRUST CONSISTING OF CURTIS C. BALDWIN, ERNEST W. BALDWIN, AND GEORGE D. BALDWIN.

STRAW SPREADER.

Application filed June 27, 1927. Serial No. 201,731.

My invention relates to harvesting machinery and more particularly to straw spreading mechanism.

My object is to provide an attachment for a combined harvesting and threshing machine whereby the straw discharged by the machine may be scattered effectively and that, actuated by the machine, will function in consonance with the rate of discharge of straw.

I provide for the accomplishment of my object an arm actuated through a crank by the reciprocating shoe of the grain-separating assembly of the machine, the arm swinging across the path of straw delivered through the hood to strike and scatter the straw equally over a considerable area adjacent the machine.

While I shall describe and illustrate my device as applied to a so-called combine, I suggest and claim its adaptability to other equipment for the purpose of spreading straw-like material.

My invention will be particularly described with references to the drawings in which:

Fig. 1 is a perspective view of my device attached to the rear portion of a grain harvesting machine.

Fig. 2 is an enlarged detail perspective view of the elements of my device shown dissociated but related.

Fig. 3 is a plan view of the device.

Referring in detail to the drawings:

1 designates generally a combined harvester and thresher, 2 a hood extending from the rear end of the machine and receiving the straw carried therethrough, and 3 is the shoe pivotally suspended from the machine at 4 and reciprocable by the bar 5 under impulse of the gearing mechanism 6. A cross bar 7 secured to the frame of the machine and an angle 8 of the reciprocating shoe, offer means for attaching my device to the machine for support and actuation as will be shown.

The device comprises the supporting bracket 9 fixed to the cross bar 7, the bell crank lever member 10, the spreader arm 11 carried by the crank member, the actuating link 12, and the propelling bar 13 fixed to the angle 8 of the moving shoe.

The bracket 9 consists of the seating portion 14 having bolt openings 15 for attachment to the cross bar, the pivot shelf 16 having a pivot opening 17, and depending ears 18 provided with the spacing screws 19, all fur purposes to be disclosed.

The bell crank lever member 10 comprises the body portion 20 having the vertical bearing opening 21 for pivotal mounting on the bracket, the socket portion 22 whereby the pole 11 is received and held, and the crank arm 23 having the openings 24 to receive the ball joint member 25. The bell crank member also has slotted lugs 26 whereby it supports a leaf spring 27 that projects between the ears of the bracket and is restrained by the spacing screws.

The lever link 12 is a ball and socket joint carrier, and comprises the bar member 28 on each end of which is a socket flange 29 securable to a corresponding mated socket cap 30 by bolts 31 inserted through the openings 32 to produce the efficient ball and socket joints for which the ends of the link are adapted. One socket member of the link receives the ball 25 that is secured in the end of the crank arm 23 while the other end of the link receives the ball 33 of the propelling arm 13 that is secured to the angle of the reciprocating shoe.

The elements having been provided as previously described, the reciprocation of the shoe causes the longitudinal movement of the propelling arm 13 which, pulling upon the link, causes the oscillation of the crank 23 pivoting on the pivot 34 received in the bearing 20, which causes the rapid movement in oscillation of the spreader arm 11. The return of the shoe causes a reverse rotation of the crank and the opposite oscillation of the spreader arm.

The spaced openings 24 of the crank arm are provided to permit adjustment of stroke by selective placement of the ball joint member 25.

Straw, it is understood, is being delivered from the machine through the hood 2, the arm striking the falling straw and scattering it as contemplated.

The particular function of the spring 27 is to confer resiliency and a whipping or flail-like character to the movements of the spreader arm.

What I claim and desire to secure by Letters Patent is:

1. In a straw spreader for actuation by the reciprocating shoe of a threshing machine, an arm rotatably mounted on the machine, and lever means pivotally connecting the arm with the shoe for rotative actuation of the arm by the shoe.

2. In a straw spreader for actuation by the reciprocating shoe of a threshing machine, a bracket on the machine, a spreader arm pivotally mounted on the bracket, and means engaging the shoe with the arm.

3. In a device of the class described, a bracket, a bell crank lever pivoted on the bracket, an arm oscillated by the lever, a spring yieldingly restraining the arm, and means actuating the lever.

4. In a straw spreader for actuation by an element of a machine, a bell crank lever pivotally mounted on the machine, a link having terminal sockets, a bar mounted on said element, ball joints on said bar and said lever received by said sockets, and a swinging arm mounted in said bell crank lever.

5. In a straw spreader for actuation by the reciprocating shoe of a threshing machine, a bracket on the machine, a spreader arm pivotally mounted on the bracket, and means for swinging the arm comprising a bar attached to the shoe and a lever operatively connecting the bar and the arm.

6. In a straw spreader for actuation by an element of a machine, a bell crank lever pivotally mounted on the machine, a link having terminal sockets, a bar mounted on said element, ball joints on said bar and said lever received by said sockets, a spreading arm mounted in said bell crank lever, means yieldingly restraining the pivoting of the lever, and means actuating the lever.

7. In a straw spreader for actuation by the reciprocating shoe of a threshing machine, a bracket on the machine, a spreader arm pivotally mounted on the bracket, means for adjusting the movement of the arm, and means for swinging the arm comprising a bar attached to the shoe and a lever operatively connecting the bar and the arm.

In testimony whereof I affix my signature.

ERNEST W. BALDWIN.